UNITED STATES PATENT OFFICE.

CARL BOSCH AND ALWIN MITTASCH, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

PROCESS OF PRODUCING TUNGSTEN.

1,175,693.     Specification of Letters Patent.     Patented Mar. 14, 1916.

No Drawing.     Application filed January 30, 1912. Serial No. 674,412.

*To all whom it may concern:*

Be it known that we, CARL BOSCH and ALWIN MITTASCH, subjects, respectively, of the King of Prussia and the King of Saxony, residing at Ludwigshafen-on-the-Rhine, Germany, have invented new and useful Improvements in Processes of Producing Tungsten, of which the following is a specification.

The specification of Patent No. 950,869 confirms the discovery by Berzelius that tungsten oxid can be reduced by means of hydrogen gas, but that a hard rough granular gray powder is obtained. This crystalline form of tungsten is not suited for use as a catalytic agent in the synthetic production of ammonia and it has been discovered that a very finely divided amorphous form of tungsten which is characterized by giving far greater yields of ammonia when employed for the catalytic production thereof and also by being more valuable for other purposes, can be obtained by reducing pure compounds, such as the oxid, halogen compounds, or ammonium tungstate, with hydrogen at a moderate temperature while employing a pressure of at least ten atmospheres. During the reduction a temperature of about 600° C. should not be considerably exceeded. If desired, tungstic acid, ammonium tungstate, and the like can be reduced directly in the contact tube by means of the mixture of nitrogen and hydrogen, provided the above-named temperature of 600° C. is not considerably exceeded, and the catalytic production of ammonia can be immediately proceeded with. If desired, the tungsten can be precipitated or placed on carriers, such for instance as silica and asbestos.

In this application the term "tungsten" is to be understood as including also a compound such as a nitrid, or amid-nitrid, thereof, which is also capable of exerting the required catalytic power, since it is difficult to ascertain, when working, whether the tungsten remains as metallic tungsten, or whether and to what degree it may be converted into such nitrid or similar compound.

The following examples will serve to illustrate further the nature of this invention, which, however, is not confined to these examples. The parts are by volume.

Example 1: Pass a current of hydrogen at a pressure of 80 atmospheres over pure tungstic acid at a temperature of from 550° to 600° C. The reduction takes place very rapidly.

Example 2: Fill pure tungstic acid into a contact tube and pass a pure mixture of 3 parts of hydrogen and 1 part of nitrogen over it at a temperature of from 550° to 600° C., and at a pressure of 150 atmospheres. The tungstic acid is first of all reduced to metallic tungsten or to a tungsten-nitrogen compound, whereupon the formation of ammonia immediately commences and continues. Any tungsten-nitrogen compound obtained by reduction with a gas containing nitrogen can be converted into the metal by dissociation *in vacuo*.

What is claimed, is:—

1. The process of producing tungsten which consists in reducing a pure tungsten compound with hydrogen at a moderate temperature and under pressure above that of ten atmospheres.

2. The process of producing tungsten which consists in reducing a pure tungsten compound with hydrogen at a temperature not considerably exceeding 600° C. and while employing pressure above that of ten atmospheres.

3. The process of producing tungsten which consists in reducing pure tungsten oxid with hydrogen at a temperature not considerably exceeding 600° C. and while employing pressure above that of ten atmospheres.

In testimony whereof we have hereunto set our hands in the presence of two subscribing witnesses.

CARL BOSCH.
ALWIN MITTASCH.

Witnesses:
   A. O. TITTMANN,
   J. ALEC. LLOYD.